June 24, 1941.     R. L. HOUSBERG     2,246,850
FISH LURE AND METHOD OF MAKING THE SAME
Filed April 26, 1940

INVENTOR.
Roy L. Housberg
BY M. Talbert Dick
ATTORNEY.

Patented June 24, 1941

2,246,850

UNITED STATES PATENT OFFICE 2,246,850

FISH LURE AND METHOD OF MAKING THE SAME

Roy L. Housberg, Webster County, Iowa

Application April 26, 1940, Serial No. 331,762

3 Claims. (Cl. 43—45)

The principal object of my invention is to make a fish lure of the "spoon" type that is so designed and weighted that it will not rotate or turn over while being drawn through the water.

A further object of this invention is to provide a fish lure that has a very attractive movement when drawn through the water.

A still further object of my invention is to provide a fish lure of the "spoon" type that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

There are many types of fish lures on the market. One of the most popular type of lures is the "spoon" type lure. These "spoon" type lures are of elongated metal or like and are curved somewhat similar to that of an eating spoon. While these lures are quite effective, they do have an undesirable tendency of rolling when drawn through the water. This undesirable action not only has a tendency to twist and snarl the fish line, but reduces the effectiveness of the lure. I have overcome such objections by providing a lure of the "spoon" type that is weighted at its lower forward end so that it will not rotate but will have highly desirable lateral and up-and-down movements while being drawn through the water.

Figure 1:
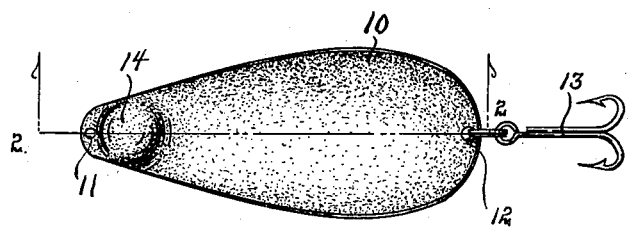
Fig. 1 is a bottom plan view of my lure ready for use.
Figure 2:
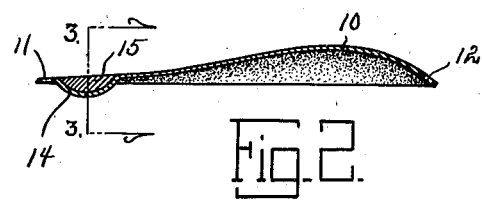
Fig. 2 is a longitudinal sectional view of my lure taken on line 2—2 of Fig. 1.
Figure 3:
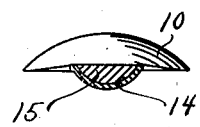
Fig. 3 is a cross sectional view of my fish lure taken on line 3—3 of Fig. 2, and more fully illustrates its construction.

Referring to the drawing, I have used the numeral 10 to designate my "spoon" type lure. This portion 10 is somewhat similar to all such lures inasmuch as it is elongated, is made of metal, tapers somewhat toward its forward end, has a rounded blunt rear end and is curved similar to that of an eating spoon as shown in the drawing. The numeral 11 designates a small hole in the forward end of the member 10 for securing the same to a leader, fish line, or like. The numeral 12 designates a similar hole through the rear end of the lure for securing the hooks 13 as shown in Fig. 1. Wherein my lure differs from other lures of this type is that the "spoon" portion 10 curves downwardly and a depression is formed in the upper forward end portion of the member 10 as shown in Fig. 2. This depression 14 is completely filled with lead, solder, or like heavy material 15. The depression 14 is formed and stamped in the metal at the same time the member 10 is cut and formed and the depression 14 is so stretched and forced downwardly by the forming tool that this pocket extends a substantial distance below the bottom rear plane of the member 10 proper as shown in Fig. 2. In order that the depression 14 will not produce an excessive drag or become tangled in weeds or like, it is circular in construction as shown in Fig. 2 and Fig. 3. After the shell portion 10, including the depression 14 is formed from said metal or like, it is a simple matter to pour molten lead or like in the depression for weighting the "spoon."

By such a construction, the weighted portion of the "spoon" would be below the longitudinal axis of the "spoon," and when the lure is pulled through the water, the force of gravity will yieldingly hold the lure in the position shown in Fig. 2. If the rear end portion of the lure is comparatively light and of larger area than the front end of the lure, the rear end of the lure will move in all directions when the same is drawn through the water, but although this movement will be desirable and attractive, the lure will not "barrel roll." These teetering vertical and horizontal movements of the rear end portion of the "spoon" lure will be accentuated by the lure being always yieldingly held so that the "spoon" lure curves downwardly instead of upwardly.

From the foregoing, it will readily be seen that I have provided a highly desirable lure and one that can be easily manufactured.

Some changes may be made in the construction and arrangement of my improved fish lure and method of making the same, without departing from the real spirit and purpose of my invention, and it is my intention to cover by my claims any modified forms of structure or use of mechanical equivalents which may be reasonably included within their scope.

I claim:

1. In a fish lure, an elongated inverted downwardly curved spoon member, a depression in the upper forward end of said spoon member, and a heavy material in said depression for providing weight at the forward end of said spoon member.

2. In a fish lure, an elongated inverted downwardly curved spoon member, and a depression formed in the forward end portion of said spoon member, said depression extending substantially below the bottom plane of said spoon member proper, and a weight in said depression.

3. The process of fabricating a fishing lure comprising pressing a piece of sheet metal into a general spoon shape, simultaneously pressing a relatively smaller depression into the forward portion of said spoon; said smaller depression being in a direction opposite to the direction of the general depression in the spoon proper, and placing relatively heavy material in said smaller depression.

ROY L. HOUSBERG.